(12) United States Patent
Grube et al.

(10) Patent No.: US 8,522,113 B2
(45) Date of Patent: Aug. 27, 2013

(54) SELECTING STORAGE FACILITIES AND DISPERSAL PARAMETERS IN A DISPERSED STORAGE NETWORK

(75) Inventors: Gary W. Grube, Barrington Hills, IL (US); Timothy W. Markison, Mesa, AZ (US)

(73) Assignee: Cleversafe, Inc., Chicago, IL (US)

( * ) Notice: Subject to any disclaimer, the term of this patent is extended or adjusted under 35 U.S.C. 154(b) by 333 days.

(21) Appl. No.: 12/942,692

(22) Filed: Nov. 9, 2010

(65) Prior Publication Data

US 2011/0185258 A1    Jul. 28, 2011

Related U.S. Application Data

(60) Provisional application No. 61/299,075, filed on Jan. 28, 2010.

(51) Int. Cl.
*H03M 13/00* (2006.01)

(52) U.S. Cl.
USPC .......................................................... 714/763

(58) Field of Classification Search
USPC .................. 714/763–766, 773, 774, 805
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 * | 2/2001 | Garay et al. | 713/165 |
| 6,256,688 B1 | 7/2001 | Suetaka et al. | |
| 6,272,658 B1 | 8/2001 | Steele et al. | |
| 6,301,604 B1 | 10/2001 | Nojima | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Nadeem Iqbal
(74) *Attorney, Agent, or Firm* — Garlick & Markison; Timothy W. Markison

(57) ABSTRACT

A method begins by a processing module receiving a data storage request that includes metadata and data. The method continues with the processing module determining a base-line set of error coding dispersal storage function parameters based on the metadata. The method continues with the processing module identifying candidate dispersed storage (DS) units based on the base-line set of error coding dispersal storage function parameters. The method continues with the processing module selecting DS units of the candidate DS units based on the metadata to produce selected DS units. The method continues with the processing module dispersed storage error encoding the data in accordance with at least a representation of the base-line set of error coding dispersal storage function parameters to produce a set of encoded data slices. The method continues with the processing module sending the set of encoded data slices to the selected DS units for storage therein.

10 Claims, 14 Drawing Sheets

(56) References Cited

U.S. PATENT DOCUMENTS

| | | | |
|---|---|---|---|
| 6,356,949 B1 | 3/2002 | Katsandres et al. | |
| 6,366,995 B1 | 4/2002 | Vilkov et al. | |
| 6,374,336 B1* | 4/2002 | Peters et al. | 711/167 |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2* | 5/2003 | Steele et al. | 714/746 |
| 6,571,282 B1* | 5/2003 | Bowman-Amuah | 709/219 |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2* | 8/2004 | Peters et al. | 711/112 |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2* | 12/2006 | Redlich et al. | 726/27 |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2003/0120723 A1* | 6/2003 | Bright et al. | 709/203 |
| 2004/0024963 A1* | 2/2004 | Talagala et al. | 711/114 |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1* | 6/2005 | Karpoff et al. | 711/4 |
| 2005/0131993 A1* | 6/2005 | Fatula | 709/202 |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1* | 4/2007 | Gladwin et al. | 711/154 |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1* | 4/2009 | Gladwin et al. | 709/203 |
| 2010/0023524 A1 | 1/2010 | Gladwin et al. | |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

\* cited by examiner weighted scoring table 214

| factors 216 | | DS unit 1 218 | | DS unit 2 220 | |
|---|---|---|---|---|---|
| category 222 | weighting factor 224 | metadata value 226 | weighted score 228 | metadata value 230 | weighted score 232 |
| up time | 0.30 | 0.999991 | 18 | 0.997363 | 10 |
| latency | 0.25 | 0.002 s | 15 | 0.2 s | 5 |
| free space | 0.10 | 0.5 TB | 6 | 10.0 TB | 10 |
| security | 0.15 | 20 | 3 | 50 | 7.5 |
| pricing | 0.20 | 0.1/Gbyte/mo | 4 | 0.02/Gbyte/mo | 12 |
| TOTAL 234 | 1.0 | | 46 | | 44.5 |

FIG. 12

SELECTING STORAGE FACILITIES AND DISPERSAL PARAMETERS IN A DISPERSED STORAGE NETWORK

CROSS REFERENCE TO RELATED PATENTS

The present U.S. Utility Patent Application claims priority pursuant to 35 U.S.C. §119(e) to U.S. Provisional Application Ser. No. 61/299,075, entitled "DISTRIBUTED STORAGE RESOURCE DETERMINATION METHOD," filed Jan. 28, 2010, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the Internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 12 is a table illustrating an example of a weighted scoring table in accordance with the invention;

DETAILED DESCRIPTION OF THE INVENTION

Figure 1:
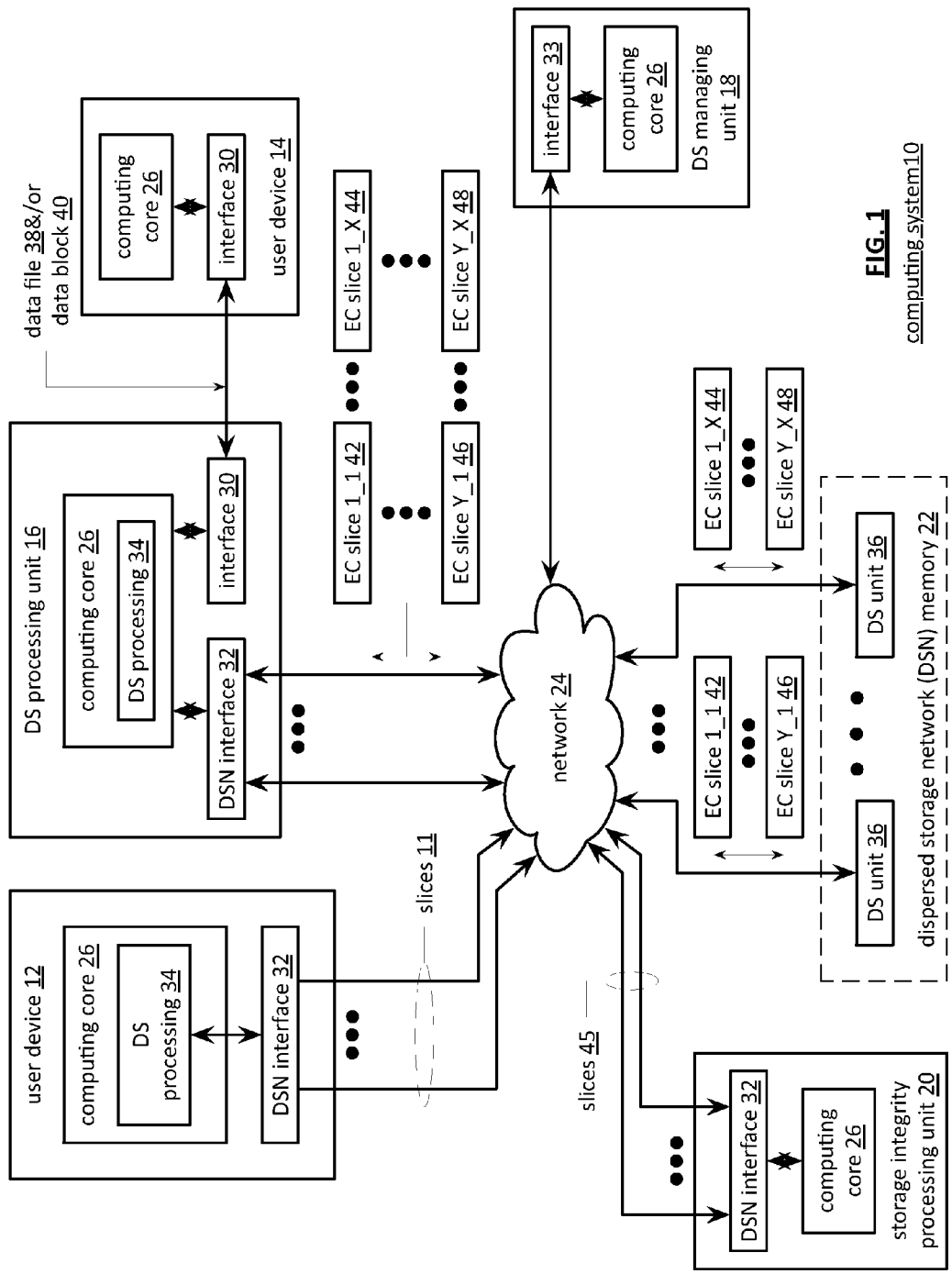
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-15.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit

18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-15.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
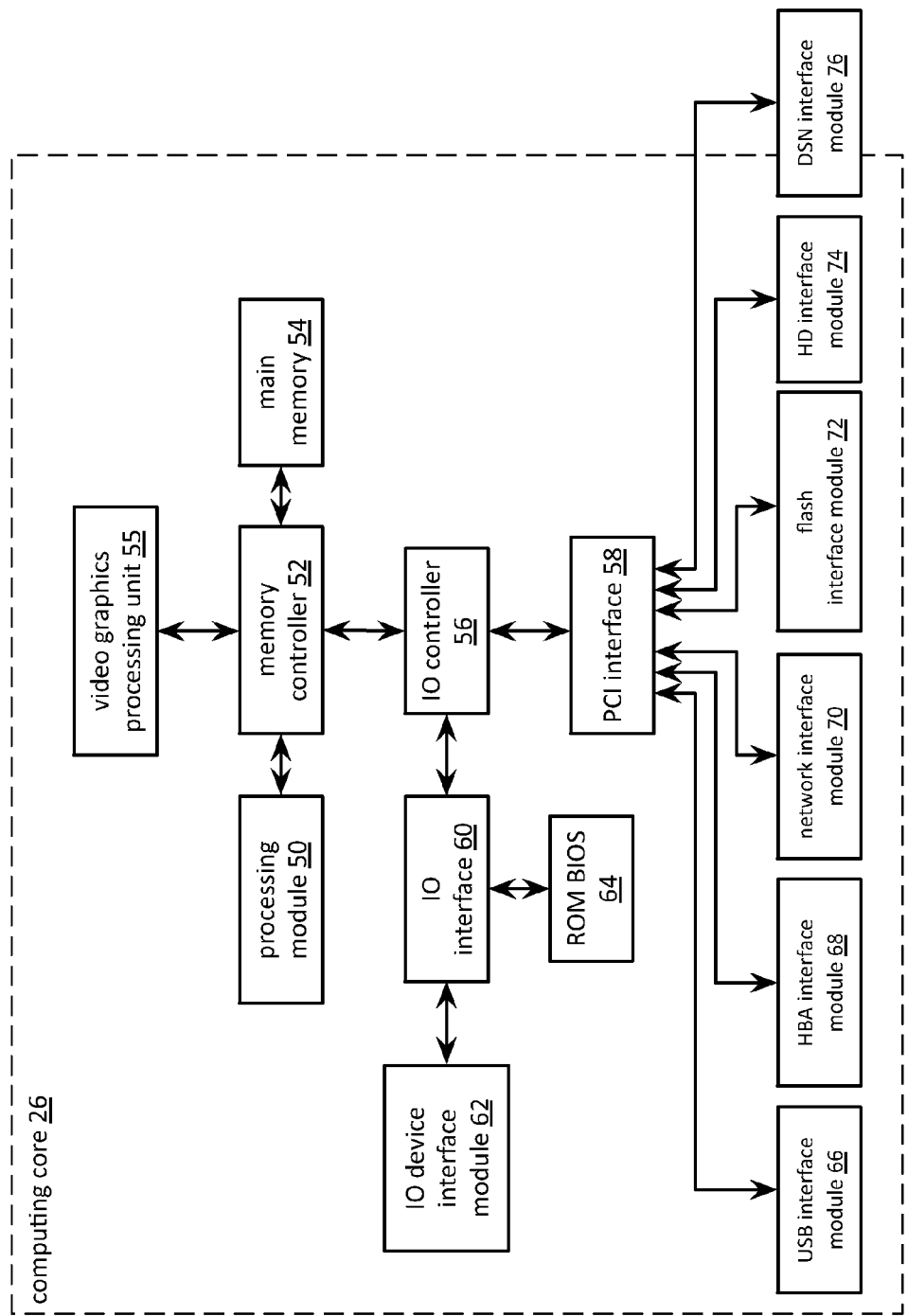
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-15.

Figure 3:
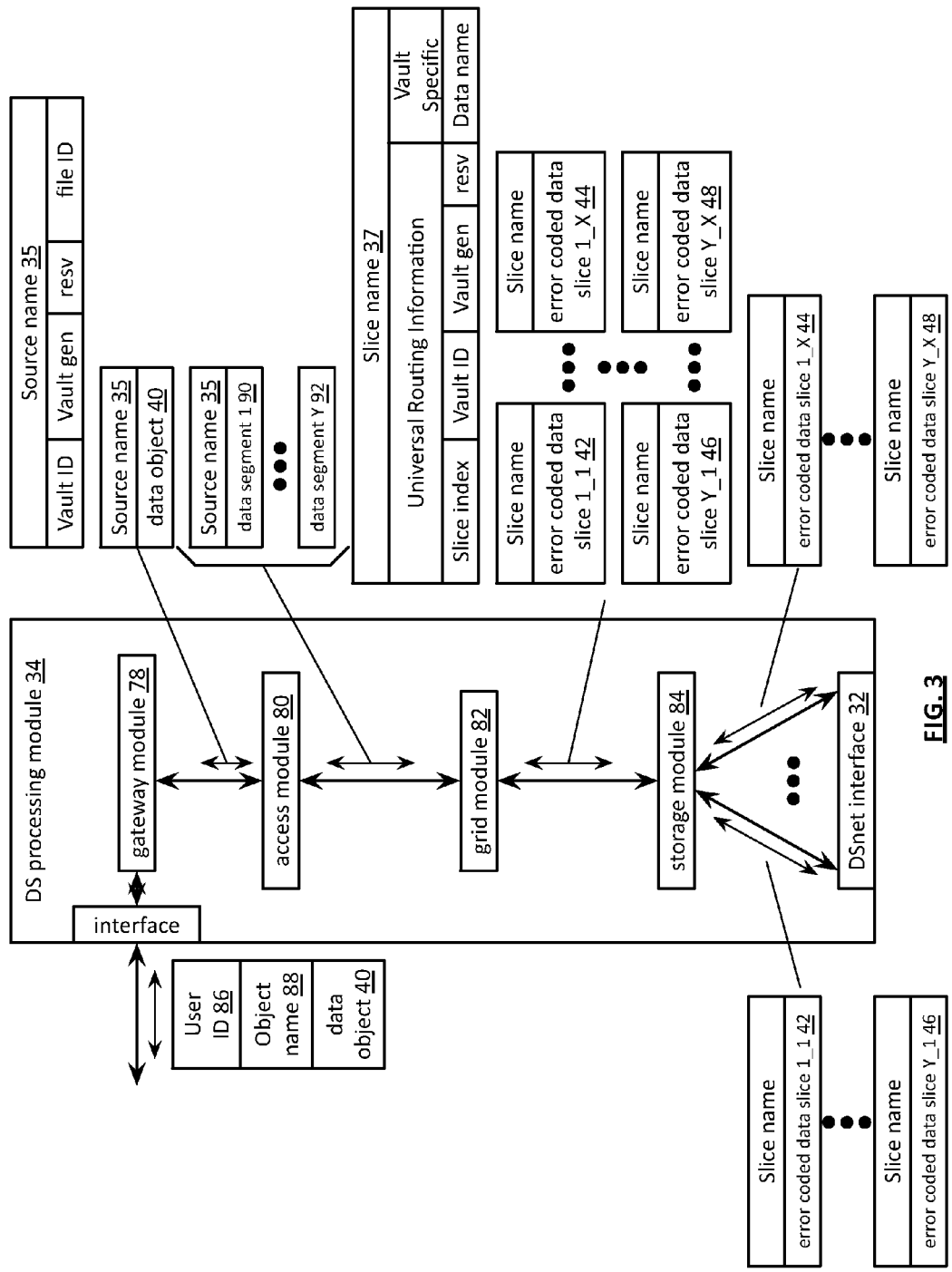
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
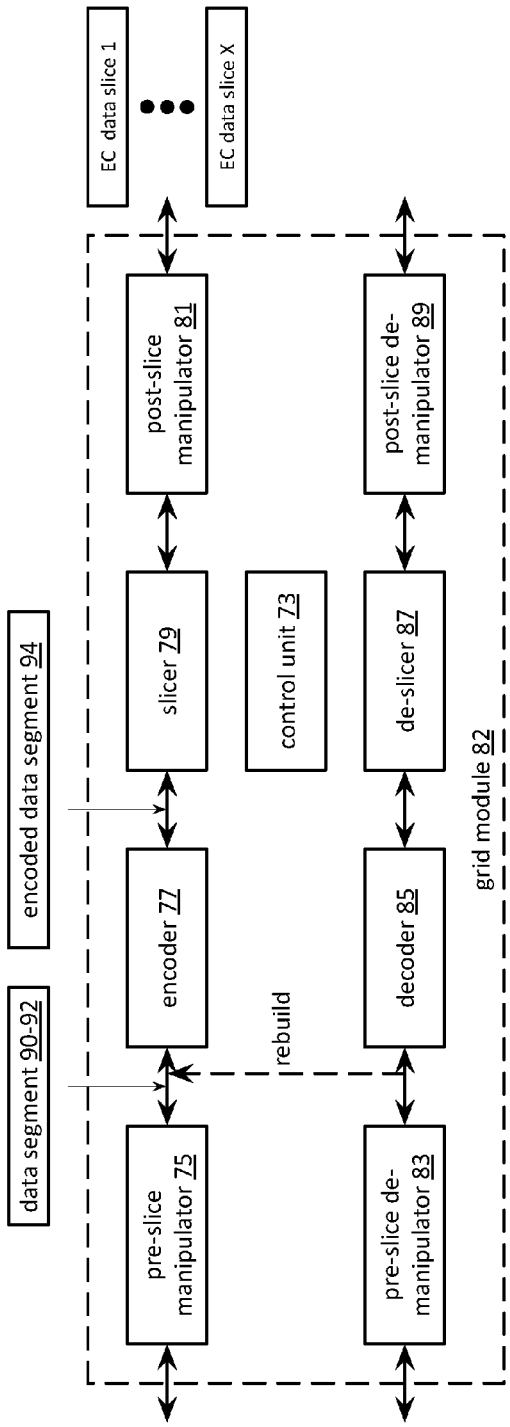
FIG. 4 is a schematic block diagram of an embodiment of a grid module in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
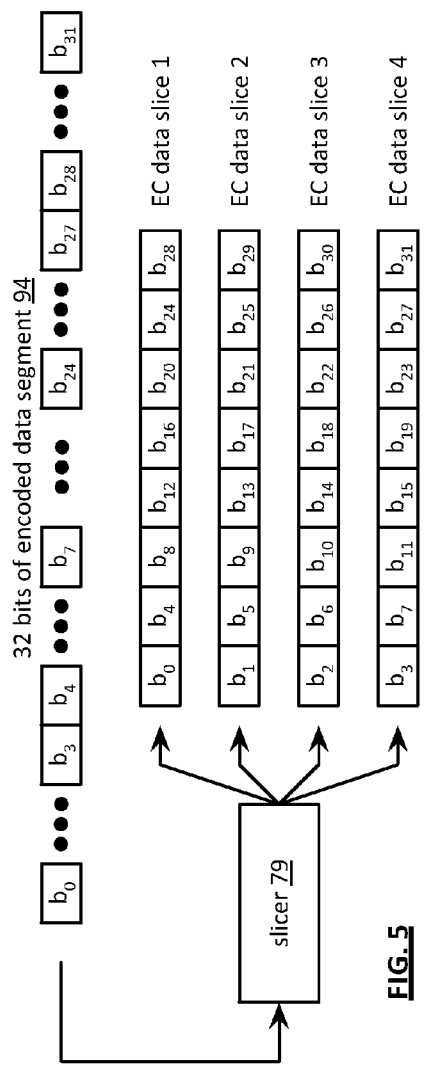
FIG. 5 is a diagram of an example embodiment of error coded data slice creation in accordance with the invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
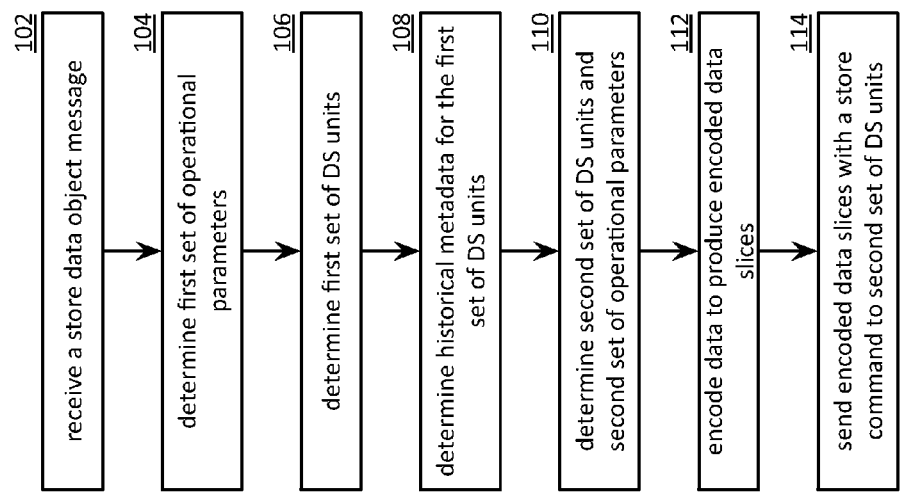
FIG. 6 is a flowchart illustrating an example of storing data in accordance with the invention.

FIG. 6 is a flowchart illustrating an example of storing data. The method begins with step 102 where a processing module receives a store data object message from one of a user device, a dispersed storage (DS) processing unit, a DS managing unit, a storage integrity processing unit, and a DS unit. The store data object message may include one or more of a user device identifier (ID), a store request command, a data object name, a data object, a data type, a data size, a performance indicator, a security indicator, a priority indicator, and metadata input.

The method continues at step 104 where the processing module determines a first set of operational parameters which may include one or more of a pillar width, a read threshold, a write threshold, and encoding method, a slicing method, an encryption method, and encryption keys. Such a determination may be based on one or more of the user device ID, a user vault lookup, the store request command, the data object name, the data object, the data type, the data size, the performance indicator, a security indicator, the priority indicator, and the metadata input. For example, the processing module determines the first set of operational parameters to include a pillar width of 16, and a read threshold of 10 based on the user vault lookup.

The method continues at step 106 where the processing module determines a first set of DS units where the first set of DS units includes candidate DS units without consideration of historic metadata (e.g., operational and performance history). Such a determination may be based on one or more of the first set of operational parameters, the user device ID, a user vault lookup, the store request command, the data object name, the data object, the data type, the data size, the performance indicator, a security indicator, the priority indicator, and the metadata input. For example, the processing module may determine the first set of DS units to include DS units 1-50 when the processing module determines that DS units 1-50 are substantially available. Note that the number of DS units that comprise the first set of DS units may be greater than the pillar width.

The method continues at step 108 where the processing module determines historical metadata for the first set of DS units where the historical metadata may include one or more of history of uptime, storage bandwidth, retrieval bandwidth, storage latency, retrieval latency, memory capacity, available memory, storage costs, rebuild time, location, and security factors (e.g., a security rating, security breach history). Such a determination may be based on one or more of the first set of DS units, a list, a query of a metadata agent, and a query of the first set of DS units. Note that a metadata agent may be implemented in any one of the system units or modules and may aggregate historical metadata information based on polling and/or receive historical metadata information from DS units from time to time.

The method continues at step 110 where the processing module determines a second set of DS units which may comprise a subset of the first set of DS units such that the second set of DS units further optimizes the choice of DS units for storage of the data object. At step 110, the processing module determines a second set of operational parameters where the second set of operational parameters coincide with the second set of DS units. Such a determination of the second set of DS units and the second set of operational parameters may be based on one or more of the first set of DS units, the first set of operational parameters, the historical metadata, a comparison of historical metadata to information received in the store data object message, and information from the user vault. For example, the processing module determines the second set of DS units to include DS units 1-5, 10-15, and 21-26. Note that the number of DS units that comprise the second set of DS units is 16, which was the original pillar width chosen in the first set of operational parameters. In such an instance, the processing module determines that the 16 DS units met the requirements. In another example, the processing module determines the second set of DS units to include DS units 1-32 and a second set of operational parameters to include a pillar width of 32 and a read threshold of 24 when the processing module determines that no combination of DS units of the first set of DS units may achieve the pillar width 16 of the first set of operational parameters will meet the requirements. In such an instance, the pillar width in a second set of operational parameters is different than the pillar width of the first set of operational parameters.

The method continues at step 112 where the processing module dispersed storage error encodes the data object to produce encoded data slices in accordance with the second set of operational parameters for the data object. At step 114, the processing module sends the encoded data slices with a store command to the second set of DS units for storage therein. In addition, the processing module may save the DS unit IDs in a list and/or in a vault to facilitate subsequent retrieval.

Figure 7:
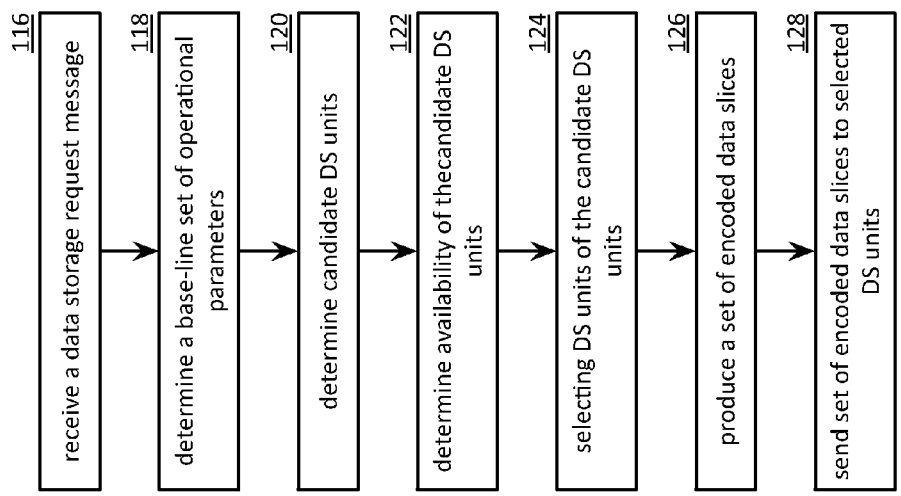
FIG. 7 is a flowchart illustrating another example of storing data in accordance with the invention.

FIG. 7 is another flowchart illustrating another example of storing data. The method begins with step 116 where the processing module receives a data storage request that includes metadata and data. Note that the metadata includes at least one of a requester identifier (ID) of a requesting device, a data ID, a data type, a data size, a storage requirement, identity of the base-line set of error coding dispersal storage function parameters, a performance indicator, a security indicator, and a priority indicator.

The method continues at step 118 where the processing module determines a base-line set of error coding dispersal storage function parameters based on the metadata. Such a determination may include at least one of selecting a slicing pillar width and read threshold pair from a plurality of slicing pillar width and read threshold pairings based on a performance indicator (e.g., similar for high efficiency, farther apart for higher reliability), an encryption method from a plurality of encryption methods based on a security indicator, selecting an encryption key based on a requester identifier (ID) of a requesting device, and selecting an error coding method from a plurality of error coding methods based on a data type. For example, the processing module may select an error coding method that is more compatible with video when the data type indicates video. In another example, the processing model selects the slicing pillar width to be 16 and the read threshold to be 10 for higher reliability.

The method continues at step 120 where the processing module identifies candidate dispersed storage (DS) units based on the base-line set of error coding dispersal storage function parameters. Such a determination may be based on one or more of the base-line set of error coding dispersal storage function parameters, a user device ID, a user vault lookup, a data storage request message, a data object name, a data object, a data type, a data size, a performance indicator, a security indicator, the priority indicator, and the metadata. For example, the processing module identifies DS units 1-50 that are known to be substantially available based on a performance indicator. Note that the number of DS units that comprise the candidate DS units may be greater than the slicing pillar width.

The method continues at step 122 where the processing module determines availability of the candidate DS units where the availability may include one or more of availability status (e.g., available now or not), an availability forecast (e.g., when it will be available in the future), and availability constraints (e.g., not available for files asked bytes in size, or only available for text data type files, or not available for files with the security indicator over a threshold). Such a determination may be based on one or more of the candidate DS units, a list, a query of an availability agent, and a query of the candidate DS units. Note that an availability agent may be implemented in any one of the system units or modules and may aggregate availability information based on polling and/or receive availability information from DS units from time to time.

The method continues at step 124 where the processing module selects DS units of the candidate DS units based on the metadata to produce selected DS units. Such a determination may be based on one or more of the candidate DS units, the base-line set of error coding dispersal storage function parameters, historical metadata, a comparison of availability information to information received in the data storage request message, and information from a user vault. For example, the processing module determines the selected DS units to include DS units 1-5, 10-15, and 21-26. Note that the number of DS units that comprise the selected DS units is 16, which was the original pillar width chosen in the base-line set of error coding dispersal storage function parameters. In such an instance, the processing module determined that the 16 DS units are available and meet the requirements.

In another example, the processing module selects DS units 1-32, a pillar width of 32 and a read threshold of 24 as the representation of the base-line set of error coding dispersal storage option parameters when there is not a combination of candidate DS units that can meet the base-line slicing pillar width of 16 requirement. Note that in this example the pillar width in the representation of the base-line set of error coding dispersal storage function parameters is different than the pillar width of the base-line set of error coding dispersal storage function parameters.

The method continues at step 126 where the processing module dispersed storage error encodes the data in accordance with at least a representation of the base-line set of error coding dispersal storage function parameters to produce a set of encoded data slices. The method continues at step 128 where the processing module sends the set of encoded data slices to the selected DS units for storage therein.

Alternatively, or in addition to, the processing module obtains error coding storage capabilities of the selected DS units and determines a set of error coding dispersal storage function parameters based on the error coding storage capabilities of the selected DS units and the metadata to provide the representation of the base-line set of error coding dispersal storage function parameters. Alternatively, or in addition to, the processing module identifies the candidate DS units based on dispersed error coding storage capabilities compatible with the base-line set of error coding dispersal storage function parameters. Alternatively, or in addition to, the processing module selects a DS unit of the DS units based on dispersed error coding storage performance characteristics being comparable to a desired dispersed error coding storage performance level. Alternatively, or in addition to, the processing module saves a record including the at least the representation of the base-line set of error coding dispersal storage function parameters and identifiers of the selected DS units.

In another example of a method of operation, the processing module receives a data storage request that includes metadata and data. Note that the metadata includes at least one of a requester identifier (ID) of a requesting device, a data ID, a data type, a data size, a storage requirement, identity of the base-line set of error coding dispersal storage function parameters, a performance indicator, a security indicator, and a priority indicator. The method enters a loop, beginning with the step where the processing module determines a current set of error coding dispersal storage function parameters based on the metadata. Such determining of the current set of error coding dispersal storage function parameters includes at least one of selecting a slicing pillar width and read threshold pair from a plurality of slicing pillar width and read threshold pairings based on a performance indicator, selecting an encryption method from a plurality of encryption methods based on a security indicator, selecting an encryption key based on a requester identifier (ID) of a requesting device, and selecting an error coding method from a plurality of error coding methods based on a data type.

The method continues with the step where the processing module selects dispersed storage (DS) units based on the current set of error coding dispersal storage function parameters to produce a current set of DS units. Such selecting of the DS units includes at least one of selecting the DS units based on dispersed error coding storage capabilities compatible with the current set of error coding dispersal storage function parameters and selecting a DS unit of the DS units based on dispersed error coding storage performance characteristics being comparable to a desired dispersed error coding storage performance level.

The method continues with the step where the processing module determines whether the current set of DS units and the current set of error coding dispersal storage function parameters provides a desired dispersed error coding storage performance level. The method repeats the loop for at least one of a new current set of error coding dispersal storage function parameters and a new current set of DS units when the processing module determines that the current set of DS units and the current set of error coding dispersal storage function parameters do not provide the desired dispersed error coding storage performance level. The method exits the loop when the current set of DS units and the current set of error coding dispersal storage function parameters does provides the desired dispersed error coding storage performance level. Next, the processing module dispersed storage error encodes the data in accordance with the current set of error coding dispersal storage function parameters to produce a set of encoded data slices. The method continues with the step where the processing module sends the set of encoded data slices to the current set of DS units for storage therein. The method continues with the step where the processing module saves a record including the current set of error coding dispersal storage function parameters and identifiers of the current set of DS units.

Figure 8:
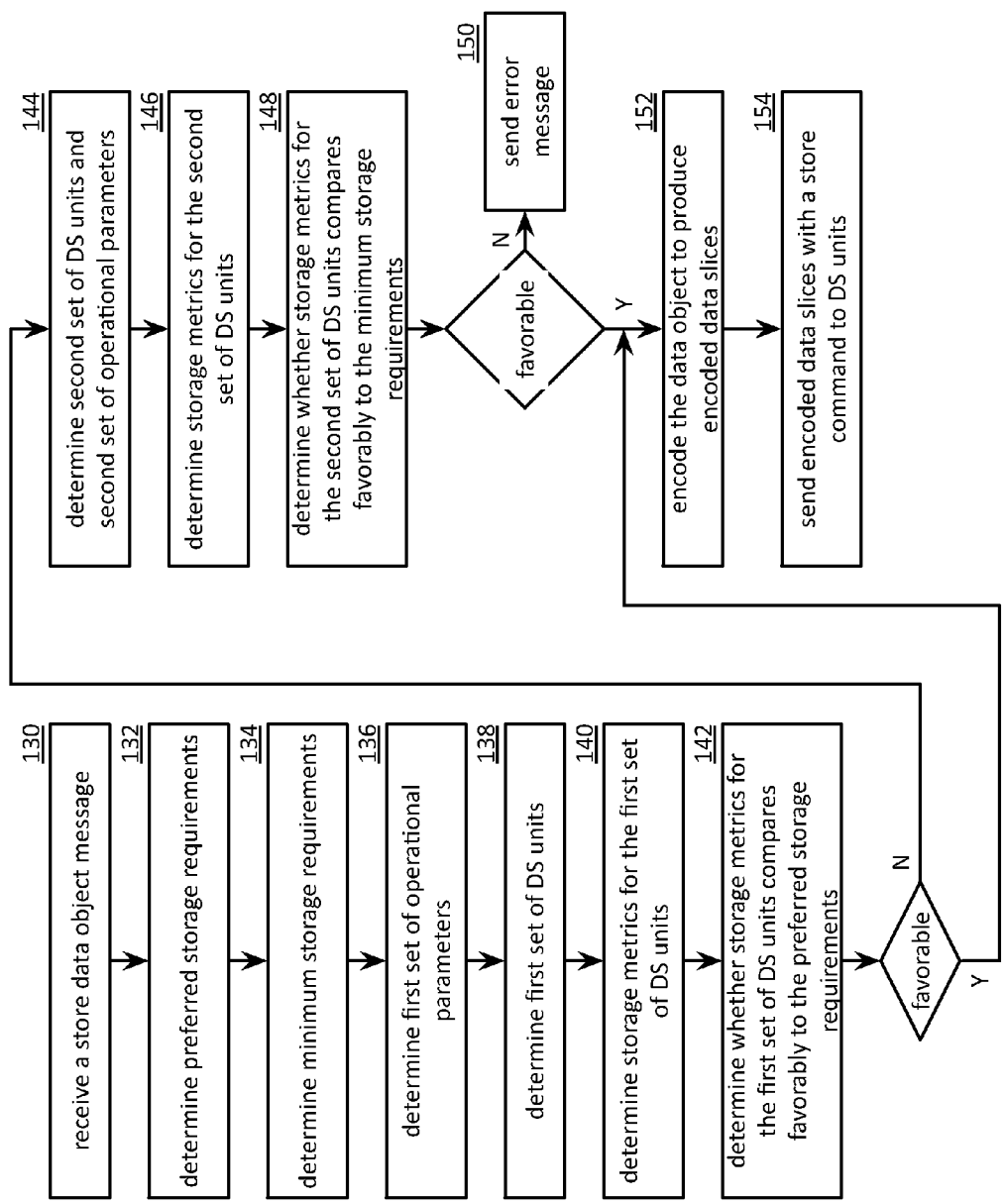
FIG. 8 is a flowchart illustrating another example of storing data in accordance with the invention.

FIG. 8 is another flowchart illustrating another example of storing data. The method begins with step 130 where a processing module receives a store data object message from one of a user device, a dispersed storage (DS) processing unit, a DS managing unit, a storage integrity processing unit, and the DS unit. The store data object message may include one or more of a user device identifier (ID), a store request command, a data object name, a data object, a data type, a data size, a performance indicator, a security indicator, a priority indicator, and metadata input.

The method continues at step 132 where the processing module determines preferred storage requirements, which may include requirements that are desired to optimize treatment of a goal (e.g., a performance level goal, a security goal, a cost goal, etc.). Such a determination may be based on one or more of information received in the store data object message (e.g., the user device ID, the store request command, the data object name, the data object, the data type, the data size, the performance indicator, the security indicator, the priority indicator), a vault lookup, a command, a message, and a predetermination. For example, the processing module determines that the preferred storage requirements include a performance requirement of a 10 ms retrieval latency time.

The method continues at step 134 where the processing module determines minimum storage requirements, which may include the minimum level of requirements that are necessary to achieve a minimal goal (e.g., a minimal performance level goal, a minimal security goal, a cost goal, etc.). Such a determination may be based on one or more of information received in the store data object message (e.g., the user device ID, the store request command, the data object name, the data object, the data type, the data size, the performance indicator, the security indicator, the priority indicator), a vault lookup, a command, a message, and a predetermination. For example, the processing module determines that the minimum storage requirements include a performance requirement of a 100 ms retrieval latency time. In such an example, the preferred storage requirement includes a 10 ms retrieval latency time. In another example, the processing module determines a minimum storage requirement to include a cost goal where the cost is a maximum price allowable.

The method continues at step 136 where the processing module determines a first set of operational parameters, which may include one or more of a pillar width, a read threshold, a write threshold, and encoding method, a slicing method, an encryption method, and encryption keys. Such a determination may be based on one or more of the preferred storage requirements, the user device ID, a user vault lookup, the store request command, the data object name, the data object, the data type, the data size, the performance indicator, a security indicator, the priority indicator, and the metadata input. For example, the processing module determines that the first set of operational parameters includes a pillar width of 16, and a read threshold of 10 based on a user vault lookup.

The method continues at step 138 where the processing module determines a first set of DS units where the first set of DS units includes candidate DS units without consideration of storage metrics. Storage metrics may include one or more of history of uptime, storage bandwidth, retrieval bandwidth, storage latency, retrieval latency, memory capacity, available memory, storage costs, rebuild time, location, and security factors (e.g., a security rating, security breach history). Such a determination may be based on one or more of the first set of operational parameters, the user device ID, a user vault lookup, the store request command, the data object name, the data object, the data type, the data size, the performance indicator, a security indicator, the priority indicator, and the metadata input. For example, the processing module may determine the first set of DS units to include DS units 1-50 based on a performance indicator. Note that the number of DS units that comprise the first set of DS units may be greater than the pillar width.

The method continues at step 140 where the processing module determines the storage metrics for the first set of DS units. Such a determination may be based on one or more of the first set of DS units, a list, a query of a storage metrics agent, and a query of the first set of DS units. Note that the storage metrics agent may be implemented in any one of the system units or modules and may aggregate storage metrics information based on polling and/or receive storage metrics information from DS units from time to time.

The method continues at step 142 where the processing module determines whether the storage metrics for the first set of DS units compares favorably to the preferred storage requirements. Note that a favorable comparison may indicate that the storage metrics meets or exceeds the requirements. The method branches to step 152 when the processing module determines that the storage metrics for the first set of DS units does compare favorably to the preferred storage requirements. The method continues to step 144 when the processing module determines that the storage metrics for the first set of DS units does not compare favorably to the preferred storage requirements.

The method continues at step 144 where the processing module determines a second set of DS units, which may comprise a subset of the first set of DS units such that the second set of DS units may fit the minimum storage requirements. At step 144, the processing module determines a second set of operational parameters where the second set of operational parameters coincide with the second set of DS units. Such a determination of the second set of DS units and the second set of operational parameters may be based on one or more of the first set of DS units, the first set of operational parameters, the storage metrics, a comparison of storage metrics information to information received in the store data object message, a list, a query of the storage metrics agent, a query of potential second set DS units, and information from the user vault.

For example, the processing module determines the second set of DS units to include DS units 1-5, 10-15, and 21-26. Note that the number of DS units that comprise the second set of DS units is 16, which was the original pillar width chosen in the first set of operational parameters. In such an instance, the processing module determines that the 16 DS units may meet the minimum requirements. In another example, the processing module determines the second set of DS units to include DS units 1-32 and a second set of operational parameters to include a pillar width of 32 and a read threshold of 24 when the processing module determines that no combination of DS units of the first set of DS units are available and that achieve the pillar width 16 of the first set of operational parameters and will meet the first set of requirements. Note that in this example the pillar width in a second set of operational parameters is different than the pillar width of the first set of operational parameters.

The method continues at step 146 where the processing module determines the storage metrics for the second set of DS units. Such a determination may be based on one or more of the second set of DS units, a list, a query of the storage metrics agent, and a query of the second set of DS units. The method continues at step 148 where the processing module determines whether the storage metrics for the second set of DS units compares favorably to the minimum storage requirements. Note that a favorable comparison may indicate that the storage metrics meets or exceeds the minimum requirements. The method branches to step 152 when the processing module determines that the storage metrics for the second set of DS units does compare favorably to the preferred storage requirements. The method continues to step 150 when the processing module determines that the storage metrics for the second set of DS units does not compare favorably to the minimum storage requirements. At step 150, the processing module sends an error message (e.g., to a requester and/or a DS managing unit)

The method continues at step 152 where the processing module dispersed storage error and codes the data object to produce encoded data slices in accordance with the first or second set of operational parameters for the data object. At step 154, the processing module sends the encoded data slices with a store command to the chosen set of DS units (e.g., first or second set of DS units) for storage therein. In addition, the processing module may save the DS unit IDs in a list and/or in a vault to facilitate subsequent retrieval.

In an alternative example of operation, preferred requirements may be chained. For instance, if a lower read latency is offered, a new higher price may be paid. In another example, requirements may vary by DS unit location. For instance, the security requirements of a DS unit in a first location may be different than the security requirements for a DS unit in a second location. In yet another example, the Processing module may negotiate with one or more of the DS units directly or through an agent to achieve more preferable storage metrics (e.g., a better price, a better grade of service).

Figure 9:
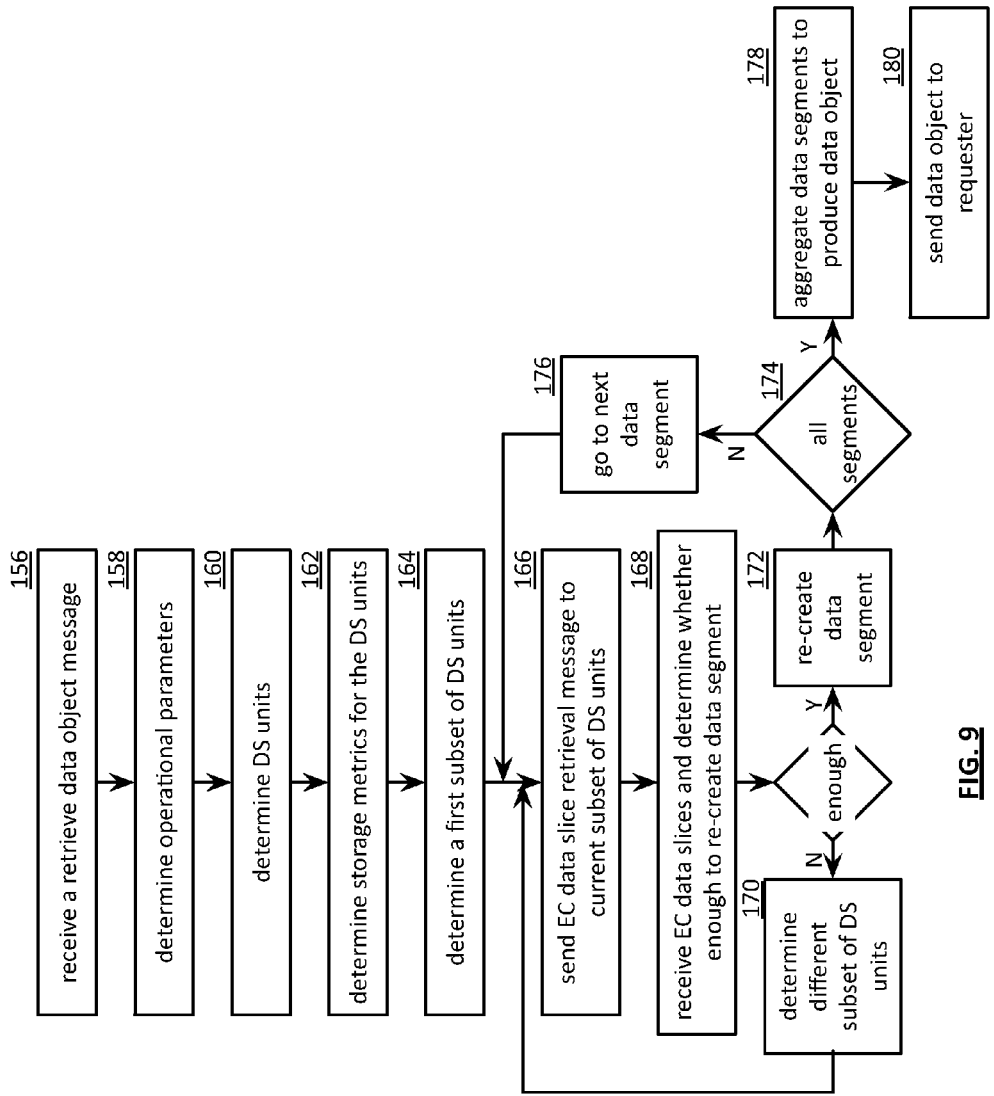
FIG. 9 is a flowchart illustrating an example of retrieving data in accordance with the invention.

FIG. 9 is a flowchart illustrating an example of retrieving data. The method begins with step 156 where a processing module receives a retrieve data object message (e.g., from a user device, a dispersed storage (DS) processing unit, a DS managing unit, a storage integrity processing unit, and a DS unit). Such a retrieve data object message may include one or more of a user device identifier (ID), a retrieve request command, a data object name, a data type, a data size, a performance indicator, a security indicator, a priority indicator, and metadata input.

The method continues at step 158 where the processing module determines operational parameters which may include one or more of a pillar width, a read threshold, a write threshold, and encoding method, a slicing method, an encryption method, slice names, and encryption keys. Such a determination may be based on one or more of the user device ID, a user vault lookup, the store request command, the data object name, the data type, the data size, the performance indicator, a security indicator, the priority indicator, and the metadata input. For example, the processing module determines that the operational parameters include a pillar width of 16, and a read threshold of 10 based on a received data type.

The method continues at step 160 where the processing module determines DS units where the DS units includes candidate DS units to retrieve slices (e.g., the pillars where the slices were stored) without consideration of storage metrics (e.g., operational and performance history). Such a determination may be based on one or more of the operational parameters, the user device ID, a user vault lookup, a virtual DSN address to physical location table lookup, the retrieve request command, the data object name, the data type, the data size, the performance indicator, a security indicator, the priority indicator, and the metadata input. For example, the processing module may determine the DS units to include DS units 1-16 where pillar slices were originally stored based on a lookup of the virtual DSN address to physical location table.

The method continues at step 162 where the processing module determines the storage metrics for the DS units where the storage metrics may include one or more of history of uptime, storage bandwidth, retrieval bandwidth, storage latency, retrieval latency, memory capacity, available memory, storage costs, rebuild time, location, and security factors (e.g., a security rating, security breach history). Such a determination may be based on one or more of the DS units, a list, a query of a storage metrics agent, and a query of the DS units. Note that a storage metrics agent may be implemented in any one of the system units or modules and may aggregate storage metrics information based on polling and/or receive storage metrics information from DS units from time to time.

The method continues at step 164 where the processing module determines a first subset of DS units, which may comprise a subset of the DS units such that the first subset of DS units further optimizes the choice of DS units for retrieval of the data object. Such a determination of the first subset of DS units may be based on one or more of the DS units, the operational parameters, the storage metrics, a comparison of the storage metrics to information received in the retrieve data object message, and information from the user vault. For example, the processing module determines the first subset of DS units to include DS units 1-5 and 11-15 when the first subset of DS units have storage metrics that indicate they have the fastest retrieval times. Note that the number of DS units that comprise the first subset of DS units is 10, which is the read threshold from the operational parameters. In such an instance, the processing module determines that the DS units meet the requirements for the fastest retrieval possible.

The method continues at step 166 where the processing module sends an encoded data slice retrieval message to the current subset of DS units (e.g., the first subset of DS units on the first pass) where the encoded data slice retrieval message may include one or more of a retrieval command, a DS unit ID, the data object name, and slice names. The method continues at step 168 where the processing module receives encoded data slices from the DS units and determines whether enough pillars (e.g., a read threshold number) have been received to re-create the data segment. The method branches to step 172 when the processing module determines that encoded data slices from enough pillars have been received. The method continues to step 170 when the processing module determines that encoded data slices from enough pillars have not been received. At step 170, the processing module determines a different subset of DS units. Such a determination of the different subset of DS units may be based on one or more of which pillars have been successfully received so far, which pillars were not successfully received (e.g., where requested), which pillars have not been tried yet, the DS units, the operational parameters, the storage metrics, a comparison of the storage metrics to information received in the retrieve data object message, and information from the user vault. For example, the processing module determines the different subset of DS units to include the DS units 6 and 7 when slices from DS units 4 and 5 were not successfully received and where the processing module determines that DS units 6 and 7 have the next best retrieval latency storage metrics. The method repeats back to step 166 where the processing module sends the encoded data slice retrieval message to the current subset of DS units (e.g., the different subset of DS units).

The method continues at step 172 where the processing module re-creates the data segment in accordance with the operational parameters. The processing module holds each data segment until all of the data segments have been successfully re-created. At step 174, the processing module determines if all the segments have been re-created. The method branches to step 178 when the processing module determines that all of the segments have been re-created. The method continues to step 176 when the processing module determines that all of the segments have not been re-created. At step 176, the processing module goes to the next data segment by selecting the slice names for the next data segment based on which data segments have been retrieved so far. The method repeats back to step 166.

The method continues at step 178 where the processing module aggregates the data segments in accordance with the operational parameters to produce the data object when the processing module determines that all of the segments have been re-created. The method continues at step 180 where the processing module sends the data object to the requester. In an alternative example of operation, the processing module determines the DS unit subset to retrieve encoded data slices based on storage metrics of the DS units when the data object was originally stored in the DS units.

Figure 10:
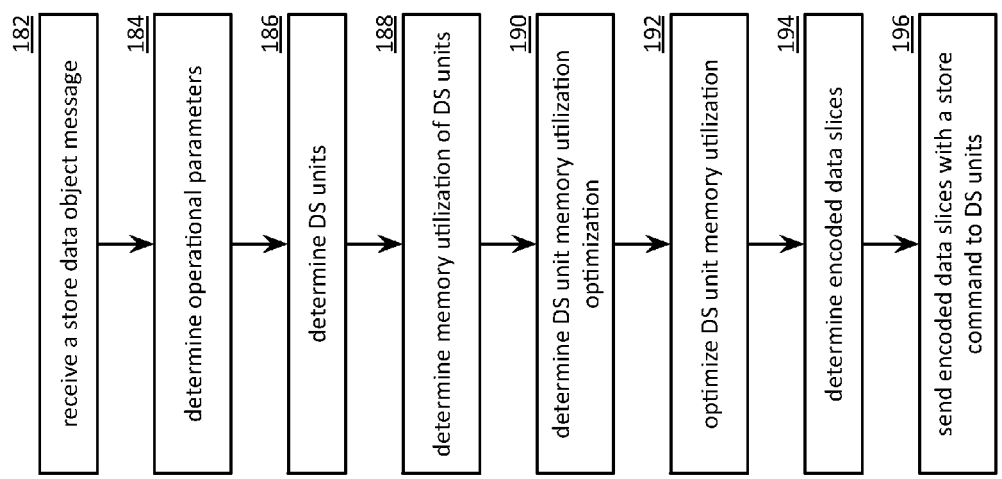
FIG. 10 is a flowchart illustrating another example of storing data in accordance with the invention.

FIG. 10 is another flowchart illustrating another example of storing data. The method begins with step 182 where a processing module receives a store data object message (e.g., from a user device, a dispersed storage (DS) processing unit, a DS managing unit, a storage integrity processing unit, and/or a DS unit). Such a store data object message may include one or more of a user device identifier (ID), a store request command, a data object name, a data object, a data type, a data size, a performance indicator, a security indicator, a priority indicator, and metadata input.

The method continues at step 184 where the processing module determines operational parameters, which may include one or more of a pillar width, a read threshold, a write threshold, and encoding method, a slicing method, an encryption method, and encryption keys. Such a determination may be based on one or more of the user device ID, a user vault lookup, the store request command, the data object name, the data object, the data type, the data size, the performance indicator, a security indicator, the priority indicator, and the metadata input. For example, the processing module determines that the operational parameters include a pillar width of 16, and a read threshold of 10 based on the data size.

The method continues at step 186 where the processing module determines DS units to optimize and send encoded data slices to for storage. Such a determination may be based on one or more of the operational parameters, the user device ID, a user vault lookup, the store request command, the data object name, the data object, the data type, the data size, the performance indicator, a security indicator, the priority indicator, and the metadata input. For example, the processing module may determine the DS units to include DS units 1-16 to accommodate the pillar width of 16 based on the performance indicator.

The method continues at step 188 where the processing module determines memory utilization for the DS units where the memory utilization may include one or more of memory capacity, available memory, utilized memory, storage costs, rebuild time, location, and security factors (e.g., a security rating, security breach history). Such a determination may be based on one or more of the DS units, a list, a query of a memory utilization agent, and a query of the DS units. Note that a memory utilization agent may be implemented in any one of the system units or modules and may aggregate memory utilization information based on polling and/or receive memory utilization information from DS units from time to time.

The method continues at step 190 where the processing module determines DS unit memory utilization optimization where a goal of such optimization may include increasing the amount of available memory by moving encoded data slices from the memory of at least one DS unit to the memory of at least one other DS unit. Such a determination may be based on one or more of the memory utilization of DS units, available memory of DS units, memory capacity of DS units, a priority indicator of data stored in DS units, a security indicator of data stored in DS units, a performance indicator of data stored in DS units, a memory threshold, and the operational parameters. In an example, the processing module determines to free up utilized memory by moving encoded data slices from a first memory of a DS unit to a second memory of the same DS unit. In another example, the processing module determines to free up utilized memory by moving encoded data slices from a memory of a first DS unit to a memory of at least a second DS unit. For instance, the processing module moves encoded data slices from a memory of a first DS unit to a memory of a at least a second DS unit when the processing module determines that the memory utilization of the first DS Unit is greater than the memory threshold.

The method continues at step 192 where the processing module optimizes DS unit memory utilization. In an example, the processing module retrieves encoded data slices from a memory of a first DS unit and sends the slices to a second DS unit for storage. The processing module sends a delete slice command to the first DS unit to delete the previously moved encoded data slices from the memory of the first DS unit. The processing module may update a virtual dispersed storage network (DSN) address to physical location table to indicate that the encoded data slices are now stored in the memory of the second DS unit. Note that the processing module may optimize the DS unit memory utilization as a background task from time to time.

The method continues at step 194 where the processing module determines the encoded data slices in accordance with the second set of operational parameters for the data object. The method continues at step 196 where the processing module sends the encoded data slices with a store command to the DS units for storage. The processing module may save the DS unit IDs in a list and/or in a vault to facilitate subsequent retrieval.

Figure 11:
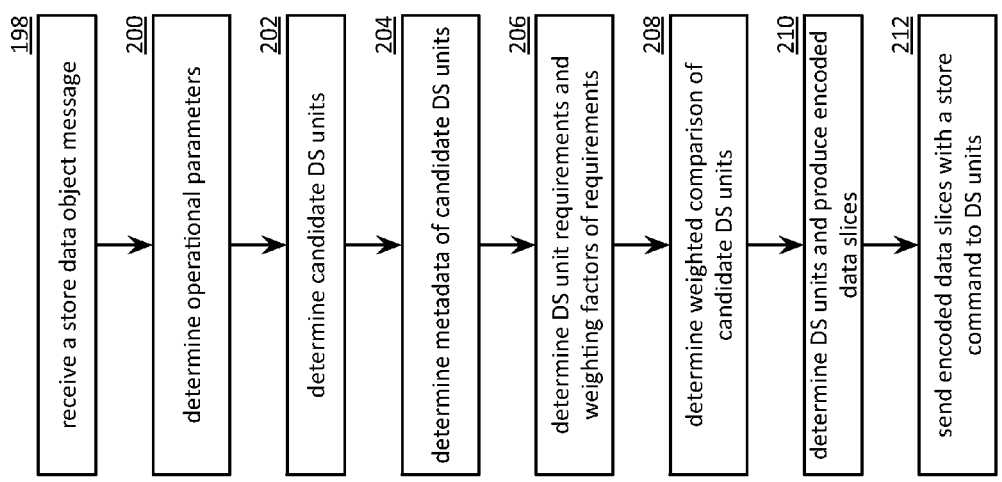
FIG. 11 is a flowchart illustrating another example of storing data in accordance with the invention.

FIG. 11 is another flowchart illustrating another example of storing data. The method begins with step 198 where processing module receives a store data object message (e.g., from a user device, a dispersed storage (DS) processing unit, a DS managing unit, a storage integrity processing unit, and/or a DS unit). Such a store data object message may include one or more of a user device identifier (ID), a store request command, a data object name, a data object, a data type, a data size, a performance indicator, a security indicator, a priority indicator, and metadata input.

The method continues at step 200 where the processing module determines operational parameters, which may include one or more of a pillar width, a read threshold, a write threshold, and encoding method, a slicing method, an encryption method, and encryption keys. Such a determination may be based on one or more of the user device ID, a user vault lookup, the store request command, the data object name, the data object, the data type, the data size, the performance indicator, a security indicator, the priority indicator, and the metadata input. For example, the processing module determines that the operational parameters include a pillar width of 16, and a read threshold of 10 based on the performance indicator.

The method continues at step 202 where the processing module determines candidate DS units where the candidate DS units are determined at this step without consideration of metadata (e.g., operational and performance history). Such a determination may be based on one or more of the operational parameters, the user device ID, a user vault lookup, the store request command, the data object name, the data object, the data type, the data size, the performance indicator, a security indicator, the priority indicator, and the metadata input. For example, the processing module determines the first set of DS units to include DS units 1-50 based on the data type. Note that the number of DS units that comprise the candidate DS units may be greater than the pillar width.

The method continues at step 204 where the processing module determines metadata for the candidate DS units where the metadata may include one or more of history of uptime, storage bandwidth, retrieval bandwidth, storage latency, retrieval latency, memory capacity, available memory, storage costs, rebuild time, location, and security factors (e.g., a security rating, security breach history). Such a determination may be based on one or more of the candidate DS units, a list, a query of a metadata agent, and a query of the candidate DS units. Note that a metadata agent may be implemented in any one of the system units or modules and may aggregate metadata information based on polling and/or receive metadata information from DS units from time to time. Note that the processing module may determine the metadata of candidate DS units as a background task from time to time.

The method continues at step 206 where the processing module determines DS unit requirements and weighting factors of the requirements where the weighting factors may indicate the relative importance of each requirement. Such DS unit requirements may include one or more of latency, security, priority, and location requirements. Such a determination may be based on one or more of the operational parameters, a vault lookup, information received in the store data object message, a predetermination, and a command. For example, the processing module determines the DS unit requirements to include the categories of uptime, agency, free space, security, and/or pricing based on indicators received in the store data object message and/or a user vault lookup. The processing module may determine the uptime weighting factor to be 0.30, the latency weighting factor to be 0.25, the free space weighting factor to be 0.10, the security weighting factor to be 0.15, and/or the pricing weighting factor to be 0.20 based on indicators received in the store data object message and/or a user vault lookup.

The method continues at step 208 where the processing module determines a weighted comparison of the candidate DS units where the comparison compares the sum of each of the products of the metadata requirement value and the weighting factor. An example of a weighted scoring table where the weighted scoring table lists the weighted scores for each of the DS units is discussed in greater detail with reference to FIG. 12.

The method continues at step 210 where the processing module determines DS units to utilize for storage from the candidate DS units such that the DS units further optimize the choice of DS units for storage of the data object. Such a determination of the DS units may be based on one or more of the DS units, the operational parameters, the DS unit metadata, DS unit requirements, weighting factors other requirements, results of the weighted comparison of the candidate DS units, a weighted scoring table lookup, the number of required DS units (e.g., the pillar width), and information from the user vault. For example, the processing module determines the DS units to include DS units 1-5, 10-15, and 21-26 where those DS units have the best weighted comparison scores amongst the candidate DS units. Note that the number of DS units that comprise the DS units is 16, which is the original pillar width chosen in the operational parameters. In such an instance, the processing module determines that the 16 DS units met the requirements in the best possible way based on the weighted scoring.

At step 210, the processing module dispersed storage error encodes the data object to produce encoded data slices in accordance with the operational parameters. The method continues at step 212 for the processing module sends the encoded data slices with a store command to the DS units for storage therein. The processing module may save the DS unit IDs in a list and/or in a vault to facilitate subsequent retrieval.

FIG. 12 is a table illustrating an example of a weighted scoring table 214. Such a table may be utilized by a processing model to compare metadata values on a weighted basis between DS units by metadata categories to facilitate a selection of an optimized set of DS units. As illustrated, the weighted scoring table 214 includes a factors section 216 and a plurality of DS unit sections 218-220 for a plurality of DS units. The factors section 216 includes a category field 222 and a weighting factor field 224 for each of the categories 222. Such categories 222 may include requirements important to a requester requesting data storage. Weighting factors stored in the weighting factor field 224 may be determined to prioritize requirements against each other to facilitate an optimized selection of DS units.

As illustrated, the DS unit sections 218-220 includes a metadata value field 226, 230 and a weighted score field 228, 232. Such metadata values 226, 230 represents raw metadata corresponding to the requirement category 222 of the DS unit identity (e.g., DS unit 1 oh field 218, DS unit 2 of field 220. Such a weighted score 228, 232 may represent the metadata value 226, 230 adjusted by a scaling function (e.g., multiplied by the weighting factor 224). The weighted scoring table to work for may also include one or more totals 234 where a total sums the weighting factors 224, and/or the weighted scores 228, 232. In an example, the weighting factors 224 total to 1.0 and/or the weighted scores 228 will have a maximum possible total of 100 points.

Note that each category 222 may have a different weighting factor 224 to adjust for the range of the metadata value 226, 230. For example, an uptime category may be measured in a "nines of reliability" fashion. For instance, a metadata value of nine nines produces a score 100 points, eight nines scores 90 points, seven nines scores 80 points, six nines scores 70 points, five nines scores 60 points, four nines scores 50 points, three nines scores 40 points, two nines scores 30 points, and one nine scores 20 points. In another example of metadata value scaling, latency may score 100 points for times less than 0.1 ms, 85 points for a latency time between 0.1 ms and 1.0 ms, 60 points for 1 ms to 10 ms, 40 points for 10 ms to 0.1 seconds, 20 points for 0.1 seconds to 1.0 seconds, and zero points for greater than 1 second. In another example of metadata scaling, free space greater than 10 terabytes (TB) may score 100 points, 80 points for 5 to 10 TB, 60 points for 0.5 to 5 TB, 40 points for 0.05 to 0.5 TB, 20 points for 0.005 to 0.05 TB, and zero points for less than 0.005 TB. In another example of metadata scaling, pricing may score 100 points for a price less than \$0.001/gigabyte/month, 80 points for \$0.001 to \$0.01, 60 points for \$0.01 to \$0.04, 20 points for \$0.04 to \$0.1, and zero points for greater than \$0.1.

As illustrated, DS unit 1 scores 18 points for uptime and DS unit 2 scores 10 points for uptime. This may indicate that DS unit 1 is a superior choice as compared to DS unit 2 for the category of uptime. As illustrated, DS unit 2 scores 10 points for free space and DS unit 1 scores 6 points for free space. This may indicate that DS unit 2 is a superior choice as compared to DS unit 1 for the category of free space.

As illustrated, DS unit 1 has a total weighted score of 46 points in DS unit 2 has a total weighted score of 44.5 points. In an example, this may indicate that on an overall basis and considering the weighting factors for each of the categories DS unit 1 may be a superior choice as compared to DS unit 2. In another example, the requester may have an absolute minimum score requirement for one or more categories and/or for the total score. For instance, a processing module may choose to utilize DS unit 1 and not DS unit 2 if the requester has a minimum overall weighted score requirement of 45 points.

In another example, the processing module may choose to utilize the required pillar width of DS units where the chosen DS units have the highest overall total weighted scores. In such an instance, the processing module may choose the DS units based on ranking the total weighted scores. In another example, the processing module may choose DS units by chaining the weighted scores of two or more categories. For instance, the processing module may choose a DS unit that has a pricing weighted score above 10 points only if the uptime weighted score is above 20 points.

Figure 13:
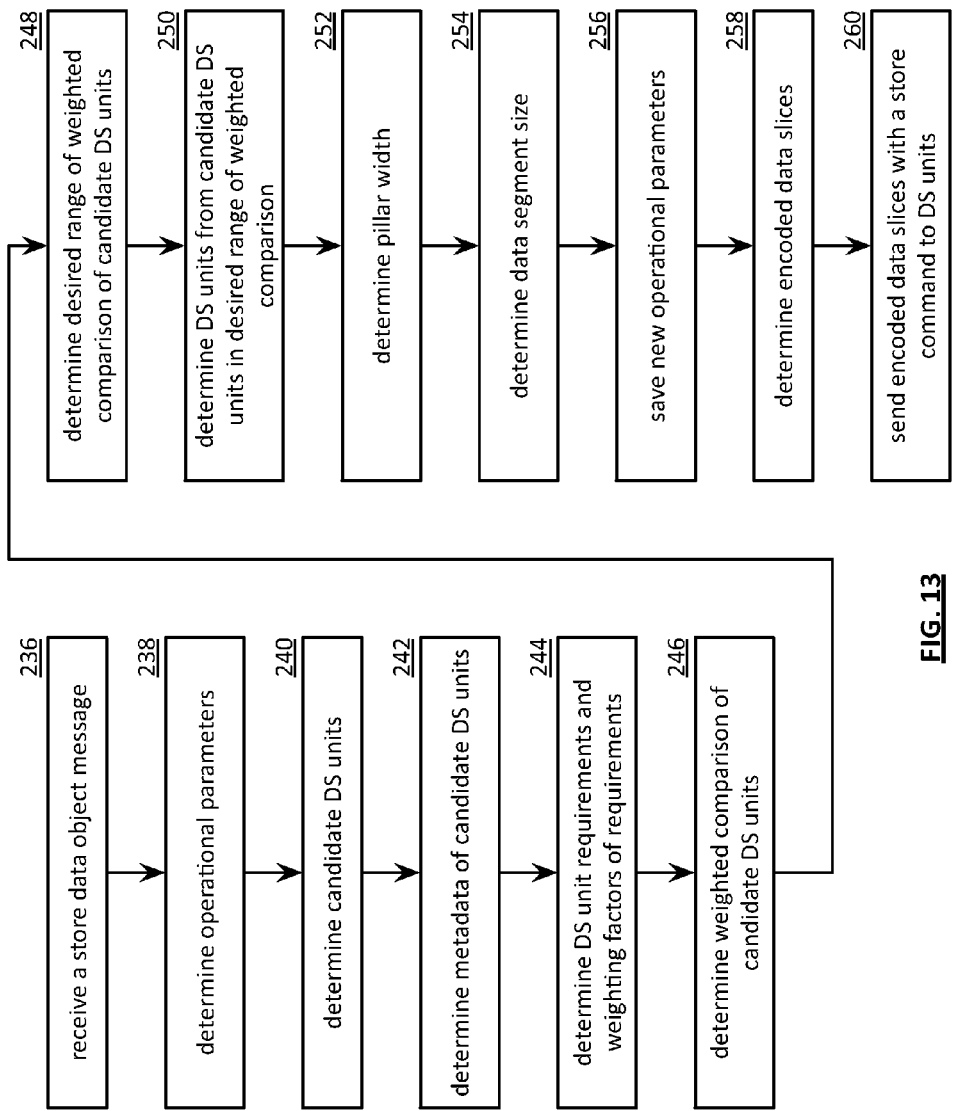
FIG. 13 is a flowchart illustrating another example of storing data in accordance with the invention.

FIG. 13 is a flowchart illustrating another example of storing data. The method begins with step 236 were a processing module receives a store data object message (e.g., from a user device, a dispersed storage (DS) processing unit, a DS managing unit, a storage integrity processing unit, and/or a DS unit). Such a store data object message may include one or more of a user device identifier (ID), a store request command, a data object name, a data object, a data type, a data size, a performance indicator, a security indicator, a priority indicator, and metadata input.

The method continues at step 238 where the processing module determines operational parameters, which may include one or more of a pillar width, a read threshold, a write threshold, and encoding method, a slicing method, an encryption method, and encryption keys. Such a determination may be based on one or more of the user device ID, a user vault lookup, the store request command, the data object name, the data object, the data type, the data size, the performance indicator, a security indicator, the priority indicator, and the metadata input. For example, the processing module determines that the operational parameters include a pillar width of 16, and a read threshold of 10 based on the user vault lookup.

The method continues at step 240 where the processing module determines candidate DS units where the candidate DS units are determined at this step without consideration of metadata (e.g., operational and performance history). Such a determination may be based on one or more of the operational parameters, the user device ID, a user vault lookup, the store request command, the data object name, the data object, the data type, the data size, the performance indicator, a security indicator, the priority indicator, and the metadata input. For example, the processing module determines the first set of DS units to include DS units 1-50 based on the data type. Note that the number of DS units that comprise the candidate DS units may be greater than the pillar width.

The method continues at step 242 where the processing module determines metadata for the candidate DS units where the metadata may include one or more of history of uptime, storage bandwidth, retrieval bandwidth, storage latency, retrieval latency, memory capacity, available memory, storage costs, rebuild time, location, and security factors (e.g., a security rating, security breach history). Such a determination may be based on one or more of the candidate DS units, a list, a query of a metadata agent, and/or a query of the candidate DS units. Note that a metadata agent may be implemented in any one of the system units or modules and may aggregate metadata information based on polling and/or receive metadata information from DS units from time to time. Note that the processing module may determine the metadata of candidate DS units as a background task from time to time.

The method continues at step 244 or the processing module determines DS unit requirements and weighting factors of the requirements where the weighting factors may indicate the relative importance of each requirement. Such DS unit requirements may include the latency, security, priority, and/or location requirements. Such a determination may be based on one or more of the operational parameters, a vault lookup, information received in the store data object message, a pre-determination, and a command. For example, the processing module determines the DS unit requirements to include the categories of uptime, agency, free space, security, and/or pricing based on indicators received in the store data object message and/or a user vault lookup. For instance, the processing module determines the uptime weighting factor to be 0.30, the latency weighting factor to be 0.25, the free space weighting factor to be 0.10, the security weighting factor to be 0.15, and/or the pricing weighting factor to be 0.20 based on indicators received in the store data object message and/or a user vault lookup.

The method continues at step 246 were the processing module determines a weighted comparison of the candidate DS units where the comparison compares the sum of each of the products of a metadata requirement value and a weighting factor. An example of a weighted scoring table where the weighted scoring table lists the weighted scores for each of the DS units is discussed in greater detail with reference to FIG. 12.

The method continues at step 248 where the processing module determines a desired range of weighted comparison scores of the candidate DS units. In such an instance, the processing module determines a minimum and/or a maximum value of a weighted score for each category. Such a determination may be based on one or more of the operational parameters, the candidate DS units, the metadata of the candidate DS units, the DS unit requirements, the weighting factors of the requirements, the weighted comparison scores, a vault lookup, information contained in the store data object message, a predetermination, and command. For instance, the processing module determines that the desired range for the uptime category is a score between 15 points and 25 points and the desired range for the pricing category is a score greater than 10 points.

The method continues at step 250 where the processing module determines DS units from the candidate DS units that have weighted scores within the desired ranges. Such a determination may be based on one or more of the comparison of the desired ranges of weighted scores to the weighted scores of the DS units, a predetermination, a command, and a lookup. In an example, the processing module determines more DS units than is required by the pillar width of the operational parameters. In another example, the processing module determines fewer DS units as required by the pillar width of the operational parameters. In such an instance, there are not a sufficient number of DS units that have weighted scores within the desired ranges. In such a scenario, the processing module may determine to change the pillar width in an iterative fashion.

The method continues at step 252 where the processing module determines the pillar width based on one or more of the number of DS units, a vault lookup, a predetermination, a command, and a message. In an example, the processing module may not change the pillar width when the number of DS units is greater than or equal to the pillar width. In another example, the processing module may lower the pillar width when the number of DS units is less than the pillar width. Note that the processing module may also change other elements of the operational parameters when the pillar width is changed. For example, the processing module may determine to change the read threshold to 5 from 10 when the processing model determines to change the pillar width to 8 from 16.

The method continues at step 254 where the processing module determines a data segment size based on one or more of the pillar width, the size of the data object, a command, a message, a lookup, and data segment size guidance from a vault lookup. At step 256, the processing module may save the modified operational parameters, which may include a new pillar width, a new data segment size, a new read threshold, new write threshold, and/or other new parameters. The processing module may save the modified operational parameters in a list and/or a vault.

The method continues at step 258 where the processing module dispersed storage error encodes the data object to produce encoded data slices in accordance with the operational parameters. The method continues at step 260 where the processing module sends the encoded data slices with a store command to the DS units for storage. The processing module may save the DS unit IDs in a list and/or in a vault to facilitate subsequent retrieval.

Figure 14:
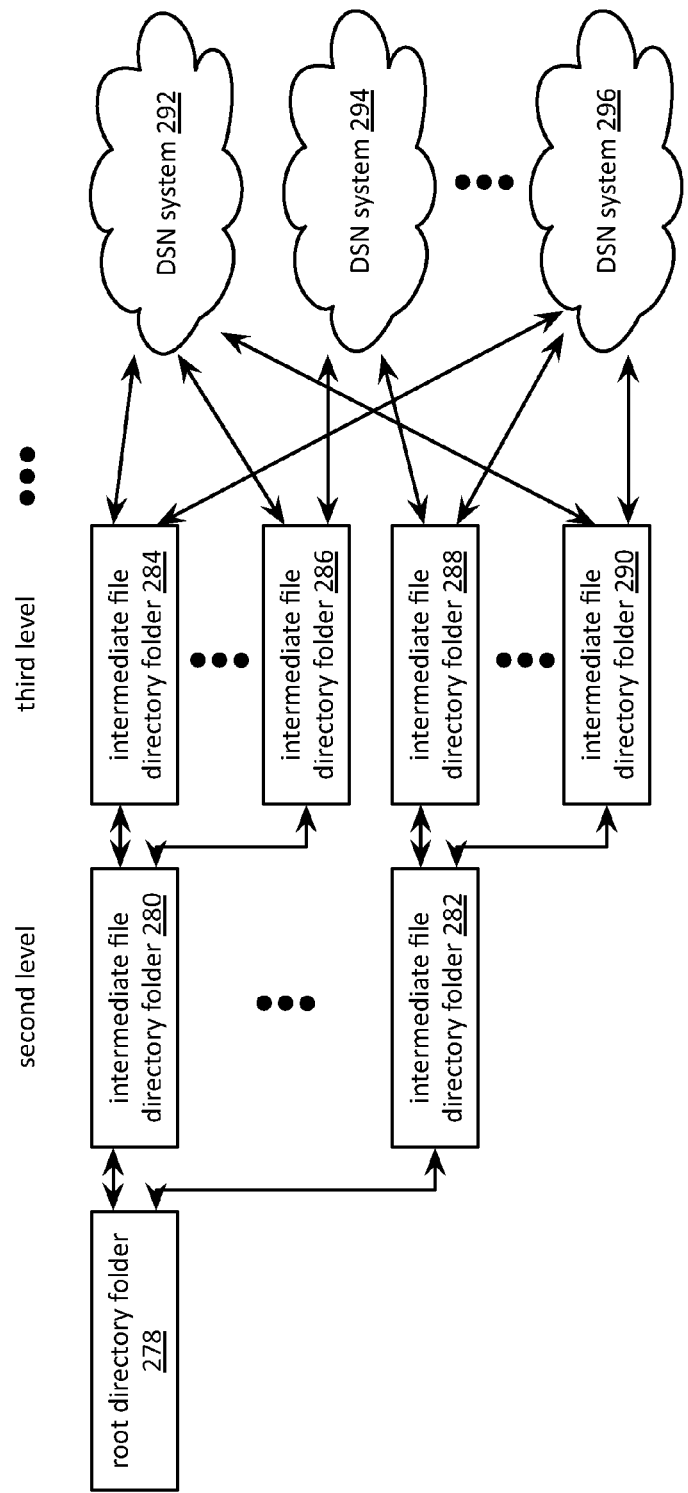
FIG. 14 is a structure diagram illustrating an example of a dispersed storage network (DSN) directory structure in accordance with the invention.

FIG. 14 is a structure diagram illustrating an example of a dispersed storage network (DSN) directory structure that includes a root directory folder 278, a plurality of second level intermediate file directory folders 280-282, a plurality of third level intermediate file directory folders 284-290, and a plurality of DSN systems 292-296. Note that any number of intermediate file directory folders may exist in a given level of the structure. Note that any number of levels may exist within the structure.

The plurality of third level intermediate file directory folders 284-290 may be utilized to associate a computer file structure (e.g., depicted as a plurality of levels) to the plurality of DSN systems 292-296. In an example, intermediate file directory folder 284 includes the root directory folder 278 identifier, the intermediate file directory folder 280 identifier, a path, a file name, a DSN system identifier of where encoded data slices are stored, DS unit identifiers of where the encoded data slices are stored within one or more of the plurality of DSN systems 292-296, and a list of the plurality of DSN systems 292-296.

In an example of operation, a processing module of a user device utilizes the computer file structure to represent a file system structure and track where data files are stored as encoded data slices within the plurality of DSN systems 292-296. For instance, a processing module dispersed storage encodes data with a filename of stuff.txt to produce encoded data slices with slice names 101-105 and stores the encoded data slices in DS units 1-5 of DSN system 296. The processing module stores stuff.txt, slice names 101-105, an identifier of DSN system 296, identifiers of DS units 1-5, an identifier of the second level intermediate file directory folder 280, and an identifier of the root directory folder 270 in the intermediate file directory folder 284. The method of operation of the processing module to utilize the structure is discussed in greater detail with reference to FIG. 15.

Figure 15:
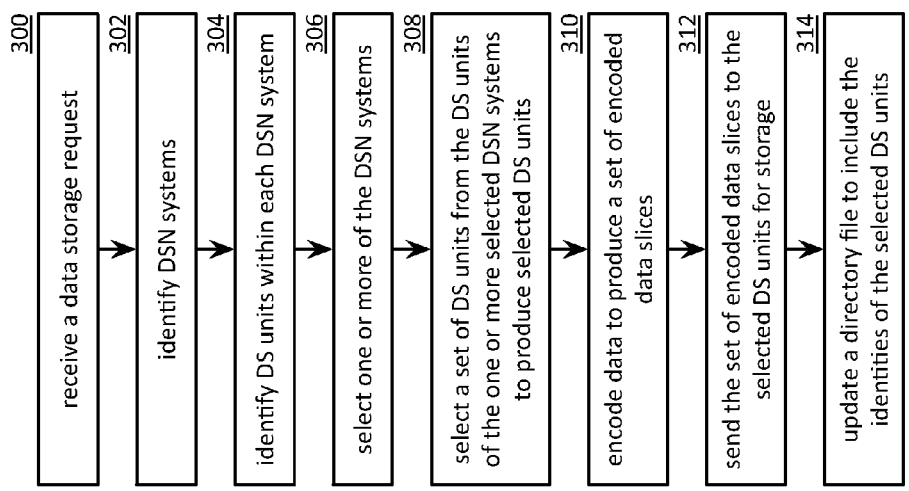
FIG. 15 is a flowchart illustrating another example of storing data in accordance with the invention.

FIG. 15 is another flowchart illustrating another example of storing data. The method begins at step 300 where processing module receives a data storage request. At step 302, the processing module accesses a file directory to identify dispersed storage network (DSN) systems. Note that the file directory may include one or more of a listing of DSN systems, a root file directory identifier, one or more intermediate file directory identifiers, a file name or data block identifier, a DSN system identifier, DS unit identifiers, and slice names. The method continues at step 304 where the processing module identifies dispersed storage (DS) units based on a desired dispersed error coding performance level to produce identified DS units for each of the DSN systems. Note that the desired dispersed error coding performance level includes at least one of an indication of dispersed error coding storage requirements, an indication of historical dispersed error coding storage performance, an indication of available storage, an indication of processing capabilities, an indication of latency performance, and an indication of bandwidth performance. For example, the processing module identifies DS units 1-5 as identified DS units when the processing module determines that the latency performance of DS units 1-5 best match the desired dispersed error coding performance level.

The method continues at step 306 where the processing module selects one of the DSN systems based on a collective dispersed error coding performance level of the identified DS units of the one of the DSN systems to produce a selected DSN system. For example, the processing module selects DSN system 3 when the collective dispersed error coding performance level indicates a lowest latency performance level amongst the DSN systems. The method continues at step 308 or the processing module selects a set of DS units from the identified DS units of the selected DSN system based on the desired dispersed error coding performance level to produce selected DS units wherein the selected DS units store a set of encoded data slices. At step 310, the processing module encodes data to produce a set of encoded data slices.

At step 312, the processing module sends the set of encoded data slices to the selected DS units for storage therein. The method continues at step 314 where the processing module updates the file directory to include an identity of the selected DS units and an identity of the set of encoded data slices. The processing module updates the file directory by one or more of creating a file name associated with the set of encoded data slices, linking the file name to one or more intermediate file directory folders, linking the one or more intermediate file directories folders to a root directory folder, linking the file name to a DSN identifier of the selected DSN system, linking the file name to slice names of the set of encoded data slices, and linking the slice names to DS unit identifiers of the selected DS units. In addition, the processing module may create at least one of the one or more intermediate file directory folders.

In an alternate example of operation, the method begins at step 300 where the processing module receives a data storage request for a particular type of data storage. Note that the particular type of data storage includes at least one of a data type indication (e.g., video, audio, text files, etc.), a weighted storage requirement (e.g., latency is more important than availability), a data retrieval latency indication, a data bandwidth indication, dispersed error coding storage function parameters, and a date usage indication (e.g., real-time, nearline, archive).

The alternate example of operation method continues at step 302 where the processing module identifies a dispersed storage network (DSN) system from a plurality of DSN systems based on the particular type of data storage to produce an identified DSN system. For example, the processing module identifies DSN system 4 one the particular type of data storage is video and DSN system 4 is optimized to store video. The method continues at step 304 where the processing module identifies dispersed storage (DS) units within the identified DSN system based on the particular type of data storage to produce identified DS units. For example, the processing module identifies DS units 10-30 when the particular type of data storage is video and DS units 10-30 are optimized to store video. The method continues with step 306 where the processing module selects the identified DSN system as a selected DSN system.

The alternate example of operation method continues at step 308 where the processing module selects a set of DS units from the identified DS units of the identified DSN system based on the particular type of data storage to produce selected DS units, wherein the selected DS units store a set of encoded data slices. For example, the processing module selects DS units 10-26 when the particular type of data storage is video and DS units 10-26 is highly optimized for video. At step 310, the processing module encodes data to produce a set of encoded data slices. At step 312, the processing module sends the set of encoded data slices to the selected DS units for storage therein.

The method continues at step 314 where the processing module updates the file directory to include an identity of the selected DS units and an identity of the set of encoded data slices. The processing module updates the file directory by creating a file name associated with the set of encoded data slices, linking the file name to one or more intermediate file directory folders, linking the one or more intermediate file directories folders to a root directory folder, linking the file name to a DSN identifier of the identified DSN system, linking the file name to slice names of the set of encoded data slices, and linking the slice names to DS unit identifiers of the selected DS units. In addition, the processing module may create at least one of the one or more intermediate file directory folders.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprises:
   receiving a data storage request that includes metadata and data;
   determining a base-line set of error coding dispersal storage function parameters based on the metadata;
   identifying candidate dispersed storage (DS) units based on dispersed error coding storage capabilities compatible with the base-line set of error coding dispersal storage function parameters;
   selecting DS units of the candidate DS units based on the metadata and on dispersed error coding storage performance characteristics being comparable to a desired dispersed error coding storage performance level to produce selected DS units;
   dispersed storage error encoding the data in accordance with at least a representation of the base-line set of error coding dispersal storage function parameters to produce a set of encoded data slices; and
   sending the set of encoded data slices to the selected DS units for storage therein.

2. The method of claim 1, wherein the metadata includes at least one of:
   a requester identifier (ID) of a requesting device;
   a data ID;
   a data type;
   a data size;
   a storage requirement;
   identity of the base-line set of error coding dispersal storage function parameters;
   a performance indicator;
   a security indicator; and
   a priority indicator.

3. The method of claim 1 further comprises:
   obtaining error coding storage capabilities of the selected DS units; and
   determining a set of error coding dispersal storage function parameters based on the error coding storage capabilities of the selected DS units and the metadata to provide the representation of the base-line set of error coding dispersal storage function parameters.

4. The method of claim 1, wherein the determining of the base-line set of error coding dispersal storage function parameters comprises at least one of:
   selecting a slicing pillar width and read threshold pair from a plurality of slicing pillar width and read threshold pairings based on a performance indicator;
   selecting an encryption method from a plurality of encryption methods based on a security indicator;
   selecting an encryption key based on a requester identifier (ID) of a requesting device; and
   selecting an error coding method from a plurality of error coding methods based on a data type.

5. The method of claim 1 further comprises:
   saving a record including the at least the representation of the base-line set of error coding dispersal storage function parameters and identifiers of the selected DS units.

6. A computer comprises:
   an interface; and
   a processing module operable to:
      receive, via the interface, a data storage request that includes metadata and data;
      determine a base-line set of error coding dispersal storage function parameters based on the metadata;
      identify candidate dispersed storage (DS) units based on dispersed error coding storage capabilities compatible with the base-line set of error coding dispersal storage function parameters;
      select DS units of the candidate DS units based on the metadata and on dispersed error coding storage performance characteristics being comparable to a desired dispersed error coding storage performance level to produce selected DS units;
      dispersed storage error encode the data in accordance with at least a representation of the base-line set of error coding dispersal storage function parameters to produce a set of encoded data slices; and
      send, via the interface, the set of encoded data slices to the selected DS units for storage therein.

7. The computer of claim 6, wherein the metadata includes at least one of:
   a requester identifier (ID) of a requesting device;
   a data ID;
   a data type;
   a data size;
   a storage requirement;
   identity of the base-line set of error coding dispersal storage function parameters;
   a performance indicator;
   a security indicator; and
   a priority indicator.

8. The computer of claim 6, wherein the processing module further functions to:
   obtain error coding storage capabilities of the selected DS units; and
   determine a set of error coding dispersal storage function parameters based on the error coding storage capabilities of the selected DS units and the metadata to provide the representation of the base-line set of error coding dispersal storage function parameters.

9. The computer of claim 6, wherein the processing module further functions to determine the base-line set of error coding dispersal storage function parameters by at least one of:
   selecting a slicing pillar width and read threshold pair from a plurality of slicing pillar width and read threshold pairings based on a performance indicator;
   selecting an encryption method from a plurality of encryption methods based on a security indicator;

selecting an encryption key based on a requester identifier (ID) of a requesting device; and selecting an error coding method from a plurality of error coding methods based on a data type.

10. The computer of claim 6, wherein the processing module further functions to:

save a record including the at least the representation of the base-line set of error coding dispersal storage function parameters and identifiers of the selected DS units.

* * * * *